United States Patent [19]

Gut

[11] Patent Number: 5,469,285

[45] Date of Patent: Nov. 21, 1995

[54] METHOD AND EQUIPMENT FOR BIDIRECTIONAL DATA TRANSMISSION (FULL-DUPLEX)

[75] Inventor: Max B. Gut, Weggis, Switzerland

[73] Assignee: Royale Consultants Ltd., Dublin, Israel

[21] Appl. No.: 186,452

[22] Filed: Jan. 24, 1994

[30] Foreign Application Priority Data

Jan. 26, 1993 [CH] Switzerland ............. 00222/93

[51] Int. Cl.$^6$ ................. H04B 10/00
[52] U.S. Cl. ............ 359/152; 359/136; 359/162; 375/219; 455/78
[58] Field of Search ............ 359/110, 113–114, 359/117, 136, 143, 152, 162, 177, 172, 187, 194; 455/78, 81; 370/32; 375/7

[56] References Cited

U.S. PATENT DOCUMENTS

4,481,678 11/1984 Sekamoto ................. 359/182
5,075,792 12/1991 Brown et al. ............. 359/154
9,233,602 8/1993 Kuwano ................... 370/32

*Primary Examiner*—Leo H. Boudreau
*Assistant Examiner*—Kinfe-Michael Negash

[57] ABSTRACT

With this method the performance of full-duplex systems can be achieved with transmission of information using infra-red light or radio (or via other transmission media not involving hard wiring). For this purpose the two datastreams to be transmitted in opposite directions are brought to the same transmission rate. The time period (ta) between the beginnings of successive bits of a datastream are split during transmission into two equal halves (tb, tc), whereby the bits are transmitted during the first half (tb). A transmitting communicator switches to receive immediately after the transmission of a bit, whereas a receiving communicator switches to transmit after the receipt of a bit if it needs to send information, so that the transmitted bits of one datastream are sent during the second half (tc) of the opposing datastream.

19 Claims, 8 Drawing Sheets

METHOD AND EQUIPMENT FOR BIDIRECTIONAL DATA TRANSMISSION (FULL-DUPLEX)

BACKGROUND TO THE INVENTION

The invention concerns a method and equipment for the bidirectional transmission of information, whereby the transmission of information is implemented between devices that are partners in communication ("communicators"), which have both a transmitter and a receiver, and whereby the information is transmitted in the form of serial bits and the direction of flow of information is switchable.

With such a method, data transmission can be implemented between two communicators—such as a computer and a printer, for example—which are not connected by cable, using infra-red light or radio as the transmission medium. Methods such as this can also be used in connection with communication networks, whereby information can be exchanged between communicators which are connected by cable within a network and those which are not connected to the network by cable.

For bidirectional data transmission, Half-Duplex and Full-Duplex types of operation are used. Full-Duplex operation gives better performance, as information flows can be transmitted simultaneously in opposite directions and need be neither stopped nor stored intermediately. This type of operation, although desirable and in many cases necessary, cannot be used with methods of the type described above because of the missing transmission medium. One such technique known from the literature uses as a result Half-Duplex operation, whereby an intermediate storage of the data to be transmitted is used. Should one communicator be sending a data packet, and a second communicator have a need to transmit data during this time period, then this second communicator stores the information to be transmitted, and sends it only after the end of transmission by the first communicator. A characteristic of Half-Duplex operation is that the change of direction is normally undertaken only at the end of a data packet. The disadvantages are the additional cost of the necessary intermediate information storage and the complex communication protocol. Additionally it can often not be decided in advance how long the maximum datastream is which must be stored. Thus a determination of the memory capacity is not possible, and because of this the memory must be dimensioned far above the average storage requirement. In addition, transmission will of course be considerably dependent on the load on the transmission medium, and delayed by varying amounts.

SUMMARY OF THE INVENTION

It is the object of the invention to propose a method of the above-mentioned type, and equipment for the implementation of this method, whereby this method gives better performance than one with Half-Duplex operation, avoids the need for intermediate storage and permits a more reliable and rational transmission of information.

With this method according to the invention, the datastreams to be transmitted in both directions are brought to the same speed of transmission. The time interval between the start of consecutive bits of a datastream is split during transmission into two equal halves, with the bits transmitted during the first half. A transmitting communicator switches to receive immediately after the transmission of a bit, whilst a receiving communicator switches to transmit after the receipt of a bit if there is a need to send information, in such a way that the transmitted bits of one datastream are sent in the second halves of the opposing datastream. Using a particular form of implementation, the scanning used in the method described above is extended in two bit steps over the actual length of a transmitted character.

The advantages achieved with the invention are seen to be that an intermediate storage of the data to be transmitted is not required, so that storage equipment or memory capacity for this purpose can be omitted. With the simultaneous appearance of both datastreams it is not necessary to stop one of the two streams (as it is with Half-Duplex operation), so that the invention's method reaches the capability of Full-Duplex systems. The proposed "interlocking" of the two opposing datastreams is achieved without the transmission of special synchronisation signals. Synchronisation with point-to-point connections is possible according to the particular embodiment mentioned above, despite the existence of a delay caused by the receiver circuit, so long as one communicator is always sending. A further advantage is that the method allows the realisation of a CSMA/CA protocol for point to multi-point connections.

The invention will be explained below in more detail using a particular embodiment as example in conjunction with the drawings.

DETAILED DESCRIPTION OF PREFERRED EMBODIMENTS

Figure 1:
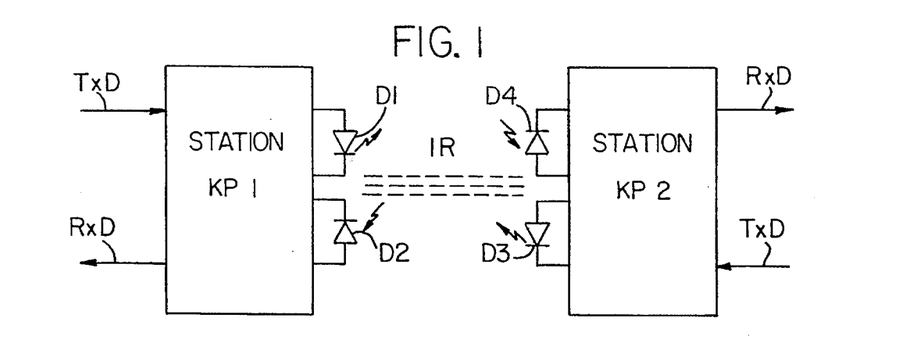
FIG. 1 is an outline drawing of an equipment according to the invention, with two communicators.
Figure 2:
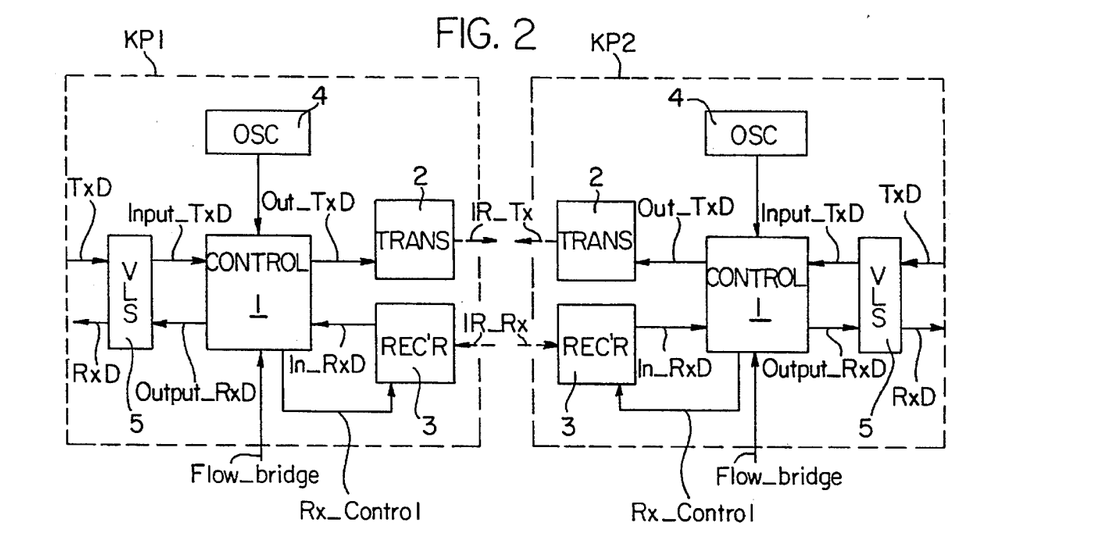
FIG. 2 shows block diagrams of the communicators in the equipment of FIG. 1.

In FIG. 1 communicators, such as computers or other intelligent electronic systems, are labelled KP1 and KP2. The communicators KP1, KP2 are each fitted with a transmitter 2 and a receiver 3 (FIG. 2). For the purpose of information transmission using infra-red (IR) light the transmitters have light emitting diodes D1, D3 and the receivers have photo-diodes D2, D4. The information to be transmitted is brought in via lines TxD, and information received is passed on via lines RxD.

As shown in FIG. 2, each communicator KP1 and KP2 has a control unit 1, which is connected to the transmitter 2 via Out_TxD and to the receiver 3 via In_RxD. An oscillator 4 is connected to the control unit, which generates a clock signal with a frequency of (for example) 5.0688 MHz. Via signal lines Input_TxD and Output_RxD, the control unit 1 is connected to a voltage level shifter 5, to which the information to be sent is taken via TxD and which outputs the information received via RxD. The information to be transmitted/received by infra-red light is shown by dashed arrows IR_Tx and IR_Rx. Via a further signal line Rx_Control the receiver 3 is connected to the control unit 1. An input to the control unit is marked Flow_bridge, by which a similarly named mode of operation can be activated. This mode of operation is described in more detail in the functional description below.

Figure 3:
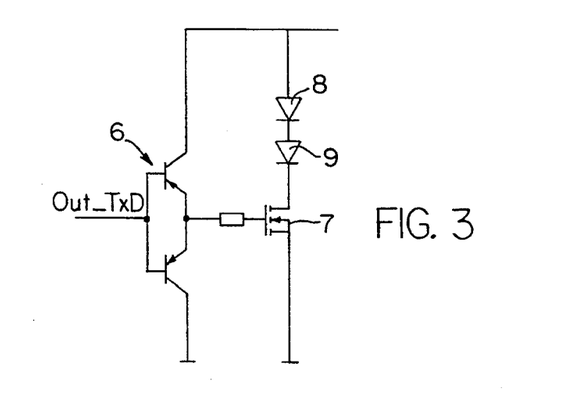
FIG. 3 is a circuit diagram of an infra-red transmitter for the equipment.

The transmitter 2 shown in FIG. 3 contains a driver stage 6, a power-FET 7 connected after the driver stage and two LEDs 8 and 9 in the output circuit. With the signal Out_TxD, connected at the input, digital signals are brought from the control unit 1 to the transmitter 2, whereby bursts of oscillations, with a frequency of 460.8 kHz for example, are transmitted from the LEDs 8 and 9. The bursts form rectangular, modulated wave trains (IV, FIG. 7).

Figure 4:
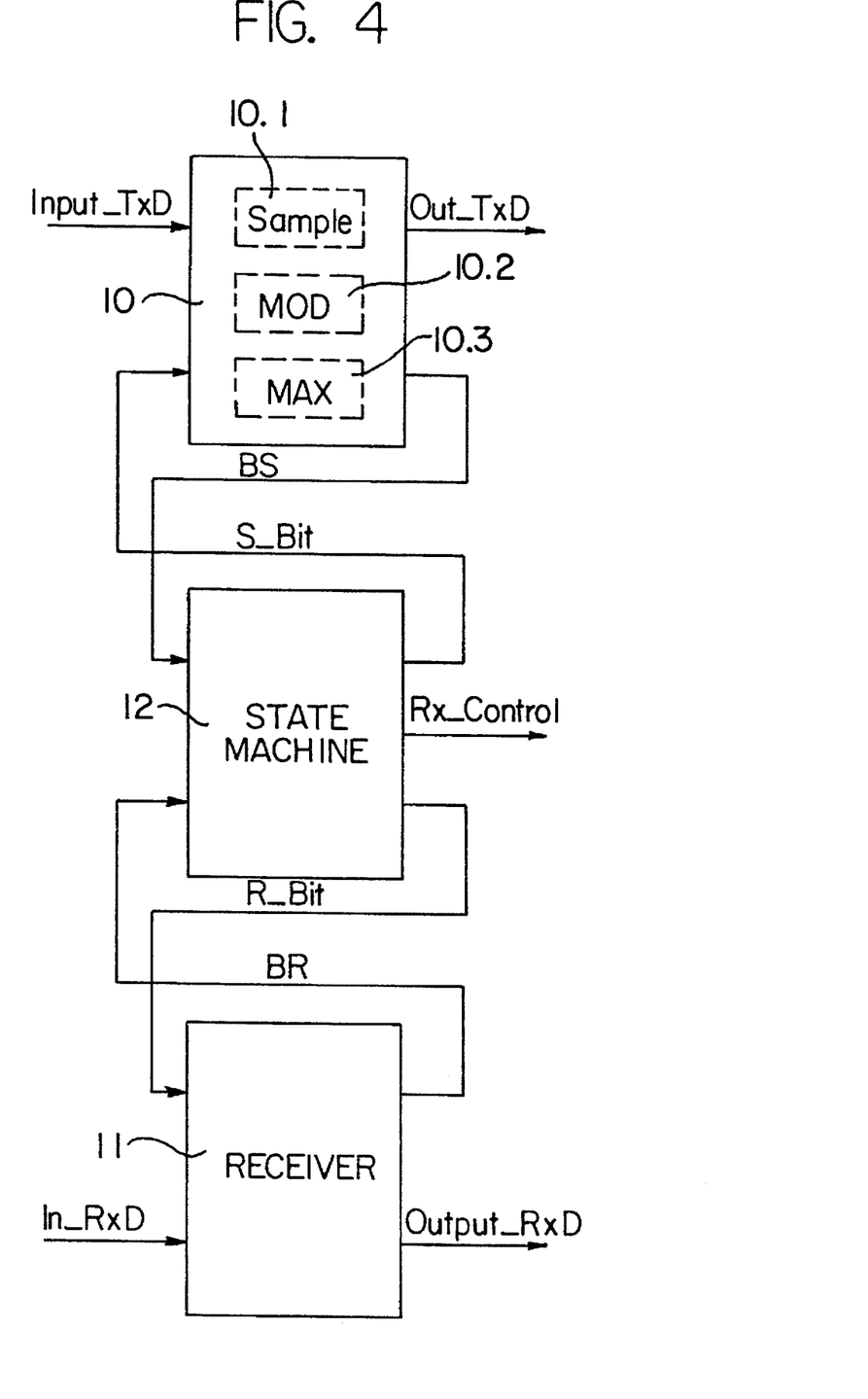
FIG. 4 is a block diagram of a control unit for the equipment.

As shown in FIG. 4, the control unit 1 contains a transmit part 10, a receive part 11 and a state machine 12. The parts 10 and 11 are connected to the state machine 12 with signals BS, S_Bit and BR, R_Bit respectively. The transmit part 10 and the receive part 11 perform transmission-related and reception-related tasks respectively and the state machine 12 co-ordinates the functions of both parts 10 and 11. The state machine also generates signals (Rx_Control) which are necessary for the control of the receiver 3. The transmit part 10 contains a sampling unit (Sample) 10.1, a modulator 10.2 and a multiplexer (Mux) 10.3.

Figure 5:
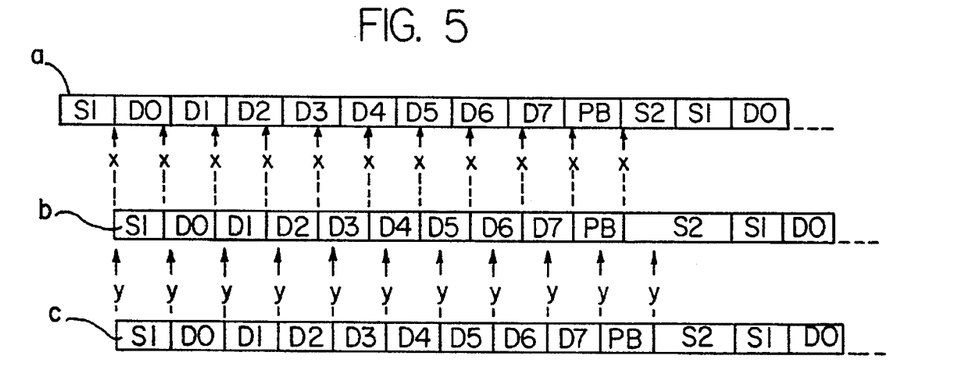
FIG. 5 shows diagrams of a datastream at a first, a second and a third speed.

In FIG. 5, the following meanings are assigned to the different parts and symbols:

a the datastream for transmission (TxD, FIG. 2) arriving at the first communicator KP1 at a first rate (speed), which consists of successive characters which in turn consist of a start bit S1, eight data bits D0–D7, a parity bit PB and a stop bit S2.

x sample points of the sampling unit (10.1, FIG. 4), by means of which the incoming datastream is transformed to a second, higher data rate or speed.

b the datastream to be transmitted, at the second data rate or speed.

y sample points of the sampling unit, by means of which a data-stream at a second communicator KP2 at the second data rate is transformed into a third data rate or speed.

c the datastream at the third data rate (speed) leaving the second communicator KP2 (RxD, FIG. 2); the third data rate is lower than the second, and corresponds to the nominal Baud rate.

The sampling points x are chosen so that the datastream b is transmitted at the maximum allowable Baud rate (9938 Bd). This sets a lower limit for the incoming datastream speed, which is determined as follows: If the first bit S1 of a character is sampled at its end, the last bit S2 of the same character must be able to be sampled directly at its beginning. In this way it is possible to transform a character bitwise, not characterwise, to a higher Baud rate, which leads to the minimum time delay. The sampling points y for the return transformation from the second to the third data rate (nominal Baud rate) are established so that the last bit of a received character can be sampled at its end, when the first bit was sampled at its beginning. The datastreams flowing in one direction from the first communicator KP1 and in the opposite direction from the second communicator KP2 are plesiochronous, i.e. they have the same nominal speed.

Figure 6:
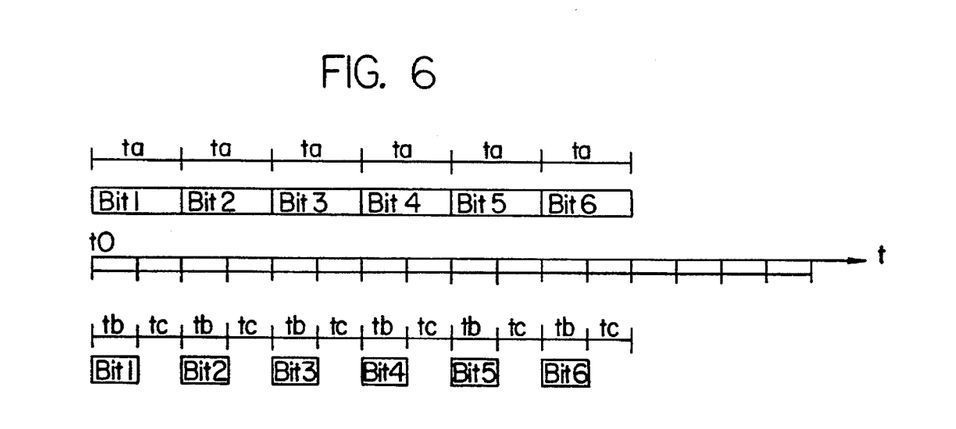
FIG. 6 are diagrams which show the time distribution of bits and "unused" time segments of a datastream to be transmitted.

As shown in FIG. 6, the time interval ta between the commencement of successive bits of a datastream is split into two equal halves tb and tc. The bits themselves are shortened and are transmitted only during the first half tb. The second half tc represents unused time as far as this datastream is concerned. In this way it is possible for two communicators to exchange information simultaneously, as the transmitted bits of a data-stream are transmitted in the first half tb and the bits of the opposing datastream are transmitted in the second half tc. In the following description the term "signal element" will also be used for the time period ta.

Figure 7:
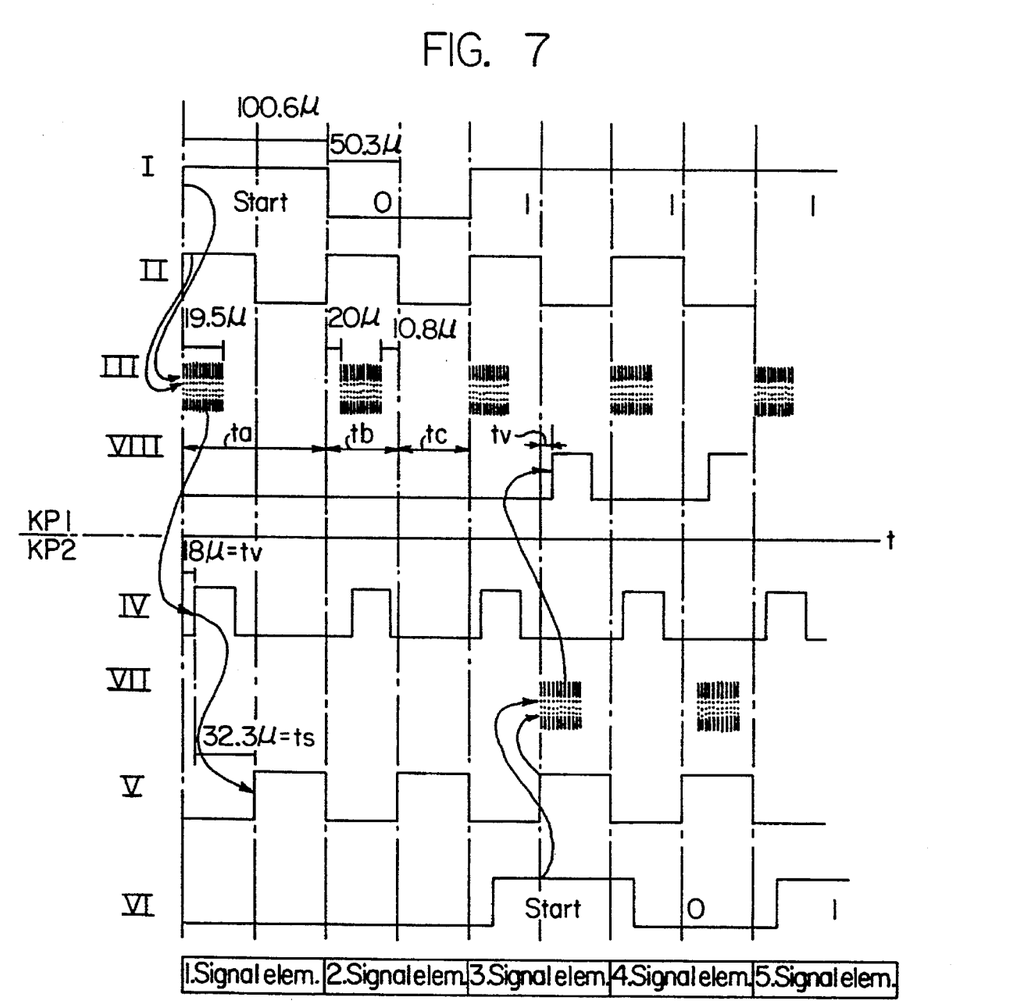
FIG. 7 is a timing diagram which illustrates the interaction of transmitted and received bits of two communicators.

In FIG. 7 the following meanings apply:

I A plesiochronous datastream TxD1 (b, FIG. 5) from the first communicator KP1; a Baud rate of 9938 gives a duration of 100.6 µs for the time period ta, and 50.3 µs each for the equal halves tb and tc.

II A transmit enable signal En Tx1 generated by the first communicator KP1, whose falling edge divides the period ta into the two equal halves tb and tc and likewise blocks transmission and enables reception.

III The bits transmitted from the first communicator KP1 in the form of position-modulated bursts of oscillations.

IV A signal RxSig2 appearing at the output of the receiver 3 of the second communicator KP2, corresponding to the transmitted bursts of oscillations (III) but offset by a delay tv of approx. 18 µs necessitated by the delay in the receiver circuit.

V A transmit enable signal for the second (receiving) communicator KP2, derived from the signal RxSig2 (IV) in such a way that its rising edge occurs after a synchronisation period of 32.3 µs after the signal RxSig2 (IV) with its delay tv of 18 µs. The synchronisation period is adjusted so that together with the delay tv it gives the half period of ta: tv+ts=tb=tc. The rising edges act as for En Tx1 (II) to enable transmission and block reception. Through the offset of one half period tb (or tc), should data appear for transmission at communicator KP2, the data bits in question are sent during the unused time period of the datastream from communicator KP1.

VI A datastream TxD2 (b, FIG. 5) to be sent from communicator KP2, plesiochronous to TxD1 (I), with the same Baud rate. A corresponding character is initiated with a start bit; this and the ensuing operation of the opposing datastream appear, of course, only if the communicator KP2 needs to transmit at that time.

VII The bits to be sent from the second communicator in the form of bursts of oscillations.

VIII A signal RxSig1 appearing at the output of the receiver 3 of the first communicator KP1, corresponding to the transmitted bursts of oscillations (VII), but offset by a delay tv of approx. 18 µs necessitated by the delay in the receiver circuit.

The transmission of the bursts (III, VII) follows the principle of pulse-burst position modulation and is controlled by the modulator 10.2 in the transmit part 10 (FIG. 4). The bursts consist of nine oscillations and have a length of 19.5 µs. The burst to represent logic "1" is sent immediately at the beginning of time ta, while on the other hand the burst to represent logic "0" is shifted by a delay of 20 µs after the beginning of ta.

Figure 8:
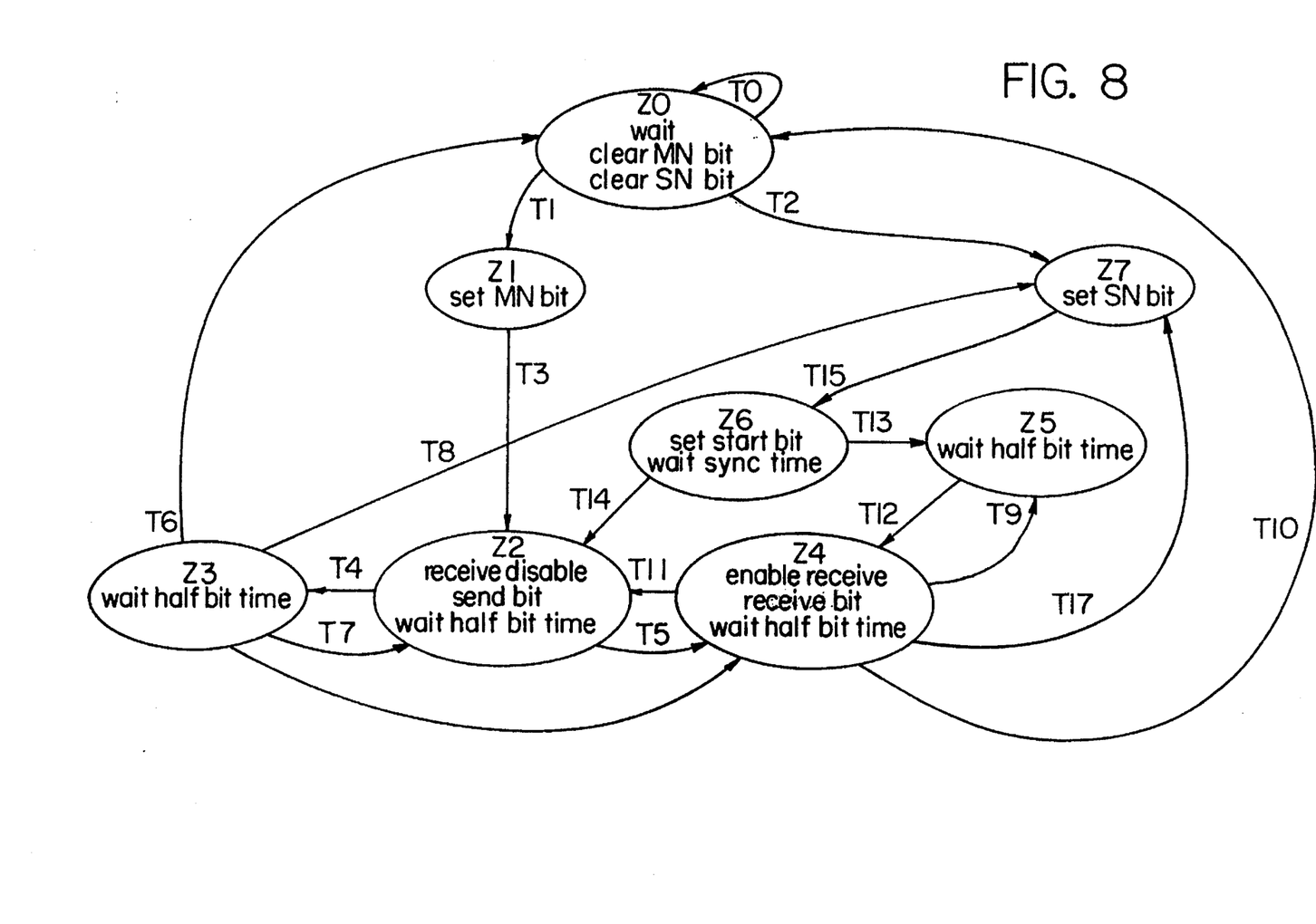
FIG. 8 is a state diagram for the control unit state machine.

The functioning of the transmission apparatus is described in more detail below, with the aid of state diagrams FIG. 8 to 12, where the various states are identified by Z0, Z1, Z2 etc. and the transitions by T0, T1, T2 etc. The transmit and receive parts 10 and 11, also the state machine 12 work together in a handshaking system (FIG. 4). The transmit part 10 indicates with the signal BS (bit to send request) to the state machine 12 that a start bit has actually appeared on the signal Input_TxD and now the bits of the incoming character are to be transmitted. The state machine 12 indicates with the signal S_Bit (send bit command) to the transmit part 10 the point in time for transmission of the bit, on the basis of the present timing condition (FIG. 7) and the whole system status (FIG. 8). In the same way, the receive part 11 indicates to the state machine 12 with signal BR (bit received) that it has received a start bit from the receiver 3 via the signal In_RxD. The state machine 12 then controls with R_Bit (receive a bit) the actual reception time point of the next bit to be received.

The system may find itself in state Z0, where there is neither a bit to send nor a bit to receive. This state is always reached after power-up or a system reset. As soon as the receiver 3 then recognises a burst, it indicates this with a rising edge on signal In_RxD. This is the first signal element in FIG. 7. The state machine 12 takes this information and changes to state Z7 via transition T2, as it is assumed that there is no bit to send at the time. Here it sets an SN flip-flop (not shown) and thereby indicates that this communicator (KP) is now a receiving communicator (EKP). Via T15 the state machine thereupon reaches state Z6, where the start bit is set and the synchronisation time (32.3 µs, FIG. 7) is allowed to elapse. Via the transition T13 it then jumps to Z5. Here half a signal element time period (50.3 µs) is allowed to elapse. During this time this EKP would transmit its first bit if there was the need for it. Afterwards the transition T12 (wait time has expired) leads to state Z4. Here the receiver 3 (FIG. 2) is activated and the first data bit is received during a half signal element time period. This is the second signal element in FIG. 7. Should there still be no information to transmit back (no bits to send) after the expiry of this time period, state Z5 is again entered via T9 and the system waits again. If there still remains no information to send from this EKP, the state machine alternates to and fro in this manner between states Z5 and Z4, until the character has been received in its entirety. Afterwards it will jump back to the rest state Z0 via T10 (there is no bit to send and no more bits to receive). The SN flip-flop mentioned above is then reset in order to indicate that, depending on the next datastream to arrive, this communicator KP can become a receiving communicator (EKP) or an initiating communicator (IKP).

If, for example as shown in FIG. 7, a start bit (rising edge on signal Input_TxD) appears during the reception of the third signal element, the EKP now also has a transmit requirement. This will be recognised in state Z4 and the state machine 12 takes transition T11 instead of transition T9. It therefore reaches state Z2, where it switches off its own receiver 3 and then has time, during the half signal element period, to transmit its own information. Because, after the transmission of this bit from the EKP, the character from the IKP is not yet fully transmitted, the state machine now switches back to state Z4 via transition T5. Now the bit from the IKP can be received during the fourth signal element. As long as both IKP and EKP simultaneously have bits to send, the state machine alternates to and fro between states Z4 and Z2.

If the IKP now has no requirement to transmit but the EKP still does, the state machine no longer moves to state Z4 via transition T5 (where another bit would be received), but instead moves via T4 to state Z3. Here it waits the half signal element time, returns to state Z2 via T7 and then sends the next bit. In this way the state machine of the EKP now alternates between states Z2 and Z3, until the EKP also has no more bits to send. The state machine 12 then returns to the rest state Z0 via transition T6.

Should the case occur that the EKP does not require to transmit somewhere in the middle of a received character, but rather this requirement arises directly as the start bit is being received, then the state machine 12 would not take the path Z0, T2, Z7, T15, Z6, T13 but instead would jump from Z6 to Z2 via transition T14. This means that the bit would be able to be transmitted during the first signal element.

If a communicator should be in the rest state and is the first to have a transmit requirement (without having previously received a bit), the state machine changes to state Z1 via transition T1. Here a second MN flip-flop (not shown) is set, and the communicator becomes the IKP (initiator). Via transition T3 the state machine 12 jumps to state Z2, where the IKP sends the first bit (first signal element). The state machine then alternates between states Z2 and Z3. If similarly the IKP later has a bit to receive, the alternation is then between states Z2 and Z4. If in a subsequent phase the IKP only has to receive and no longer has to send, alternation between states Z4 and Z5 follows. Depending on whether the last condition was send or receive, the state machine returns to the rest state via T6 or T10 respectively. The transitions T8 and T17 allow the realisation of a "flow bridge".

The sampling unit 10.1 of the transmit part 10 has the task of transforming the data (TxD sample), which is already related to the clock signal of the oscillator 4, up to a higher transmission rate of 9938 Baud (which corresponds to a signal element period of 100.6 µs, see FIG. 5). This process will be explained in more detail below with the aid of the state diagram (FIG. 9) for the sampling unit.

Figure 9:
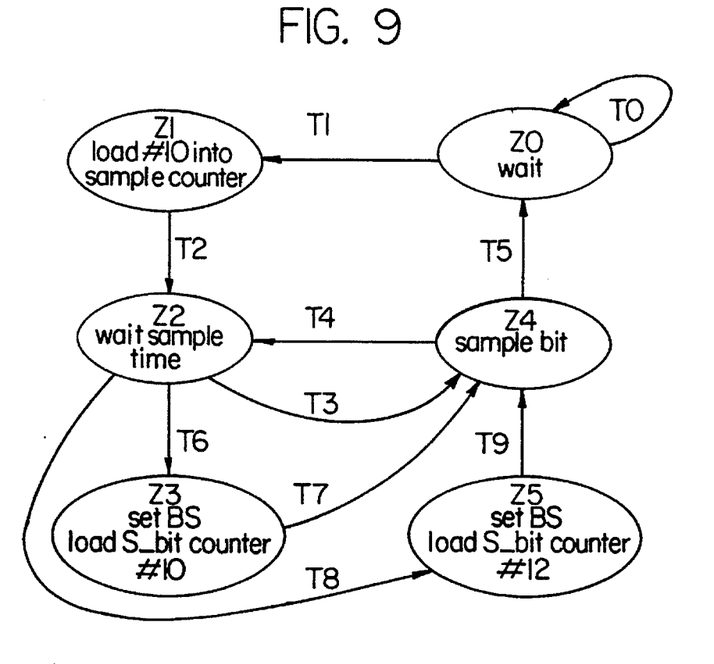
FIG. 9 is a state diagram for the state machine of a sampling unit in the send part of the control unit.

The starting point is again state Z0, which denotes the rest state. Now if a rising edge occurs on signal Input_TxD_Sample, state Z0 is left and state Z1 entered (T1). There a Sample counter (not shown) is loaded with the value 10. State Z2 is always the next to be entered, via T2. In this state the first sample point is awaited as per FIG. 5. After the expiry of this sample time, state Z3 is entered via T6 where a BS flip-flop (not shown) is set. The output of this flip-flop (signal BS) indicates to the state machine 12 that there is now a bit to send, coming from the modulator 10.2. Simultaneously, an S_Bit counter (also not shown) is loaded. This counts how many bits of a character have already been transmitted. In the next state Z4, which is reached via T7, this bit is sampled, the Sample counter is decremented, and then Z2 is immediately reached via T4. Here the next sample point is again awaited. After the expiry of this sample time, the machine jumps to Z4 via T3 where the next signal element is sampled. The following signal elements are sampled in the same way (alternation between Z2 and Z4). When all signal elements have been sampled, the subsystem returns to the rest state via T5. In this way a start bit sets off a fixed sampling process, which proceeds autonomously until all signal elements have been sampled. As soon as the modulator 10.2 has effectively transmitted all of the bits, it resets the BS flip-flop. With this the state machine 12 is signalled that there are no more bits to send and the state machine can carry out the corresponding state change.

Figure 12:
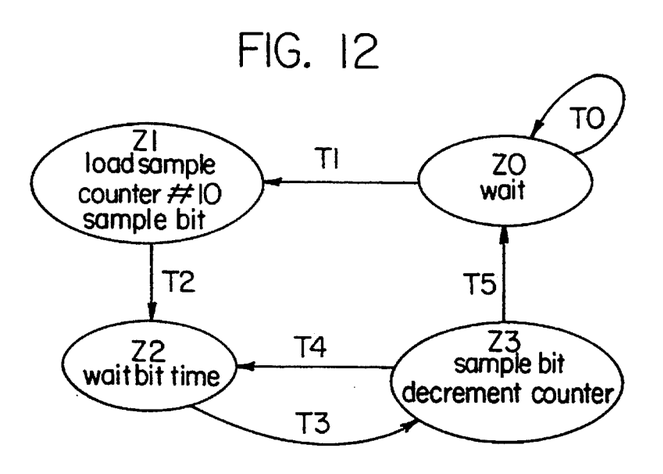
FIG. 12 shows a further state diagram for the state machine of a sampling unit in the receiver part of the control unit.

For the reduction of the transmission speed to the nominal Baud rate, a sample unit (similar to the sample unit 10.1) in the receive part 11 functions in a similar fashion, as shown in the state diagram FIG. 12.

If the system is set up in a point-to-point connection, the "Flow_bridge" operating method is selected (activation of the relevant input to the control unit 1). With this method the value 12 is loaded into the S_Bit counter instead of the value 10. In this way a character appears to the system to be two bits longer, which represents the implementation of a flow-bridge mechanism on the transmit side. At a lower level, the modulator 10.2 is blocked during the last two bits, if the start bit of a new character is not already present for sending during this time. If a new character is ready for transmission, this will be synchronised and transmitted in time with the continuing sampling, and not synchronised with the rising edge of the signal Input_TxD_Sample. After reaching the corresponding state Z5 via T8 and leaving it via T9, the sampling process continues as already described.

Figure 10:
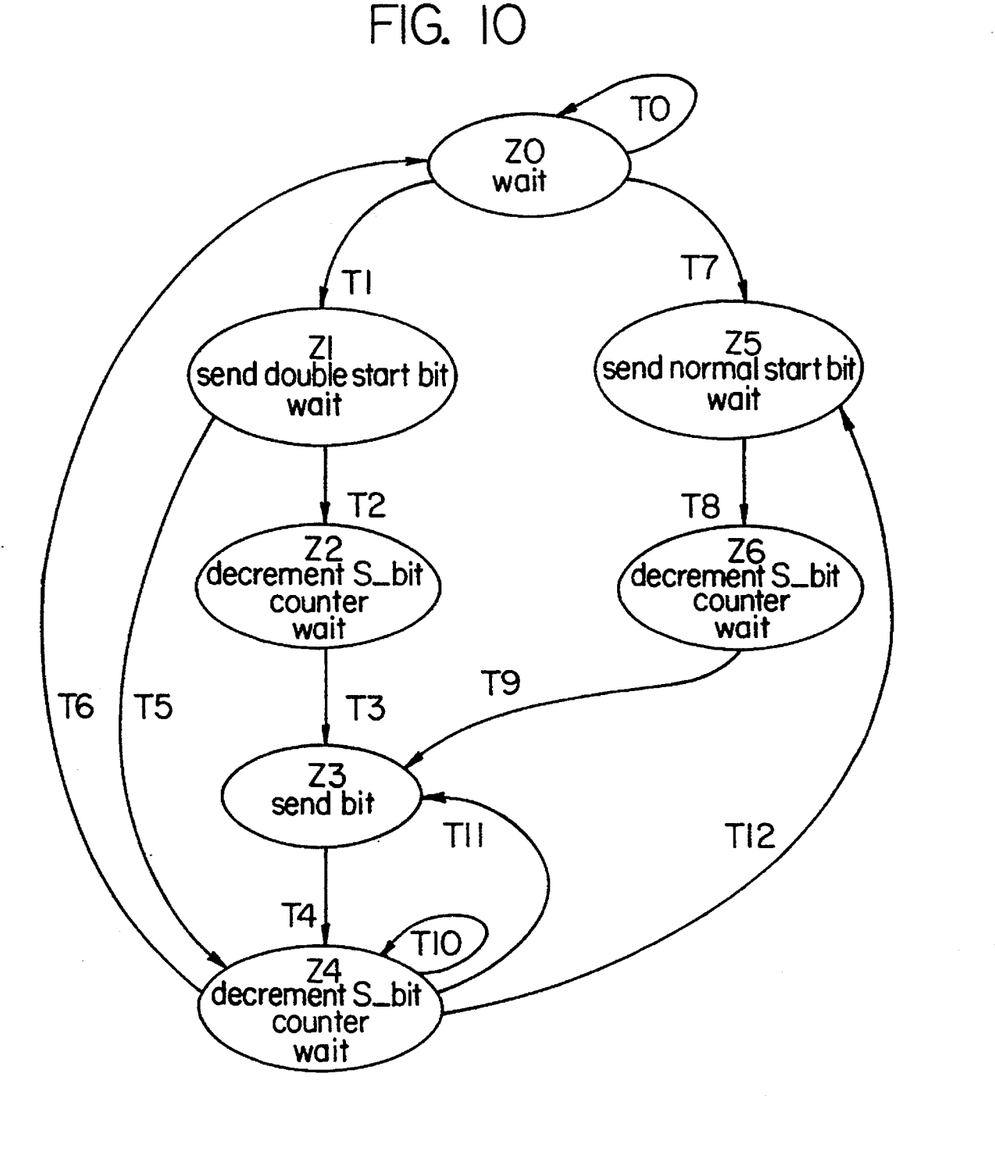
FIG. 10 is a state diagram for the state machine of a modulator in the control unit.

As shown on FIG. 10 the modulator 10.2 at its starting point is in state Z0. As soon as there is a bit to be sent, this is signalled to the modulator 10.2 by the state machine 12. Depending on the type of communicator (receiving, EKP, or initiating, IKP) the system now changes to state Z5 or Z1 respectively, where a single or double start bit is sent. Via T2 or T8, the system reaches state Z2 or Z6 respectively, where the S_Bit counter is decremented and the wait time is allowed to expire. After jumping via T3 or T9 the current bit is sent (state Z3), either directly (if a logic 1 is to be represented) or after a wait time of 19.5 μs (for the transmission of a logic 0). The S_Bit counter is decremented in state Z4 after transition T4 (falling edge on S_Bit). The system then waits again. After this wait time, the next bit can be sent (T11, Z3). At the end of a character the system waits for two pseudo-bits, if the flowbridge is active (T10). During this time the output of the modulator 10.2 is blocked. If this communicator is the IKP and a new start bit occurs during this time, the state changes from Z4 to Z1 via T5. Here the double length start bit is sent. If the communicator is an EKP, it jumps to state Z5 via transition T12. Should this start bit not follow immediately, it jumps again via T6 to state Z0 which is the starting point. With this the flow-bridge is broken.

The task of the multiplexer 10.3 is to ensure, according to the system configuration, that the correct signal source is always switched to the modulator 10.2. Signal sources in this sense can be: 1) the signal brought in via TxD (actual datastream), 2) the signal received directly over the communication link (loop-back mode, if the communicator is an EKP and a CSMA/CA protocol is in use), and 3) optionally a device address if the receiver is commanded to do so by a general broadcast over the communication link.

Figure 11:
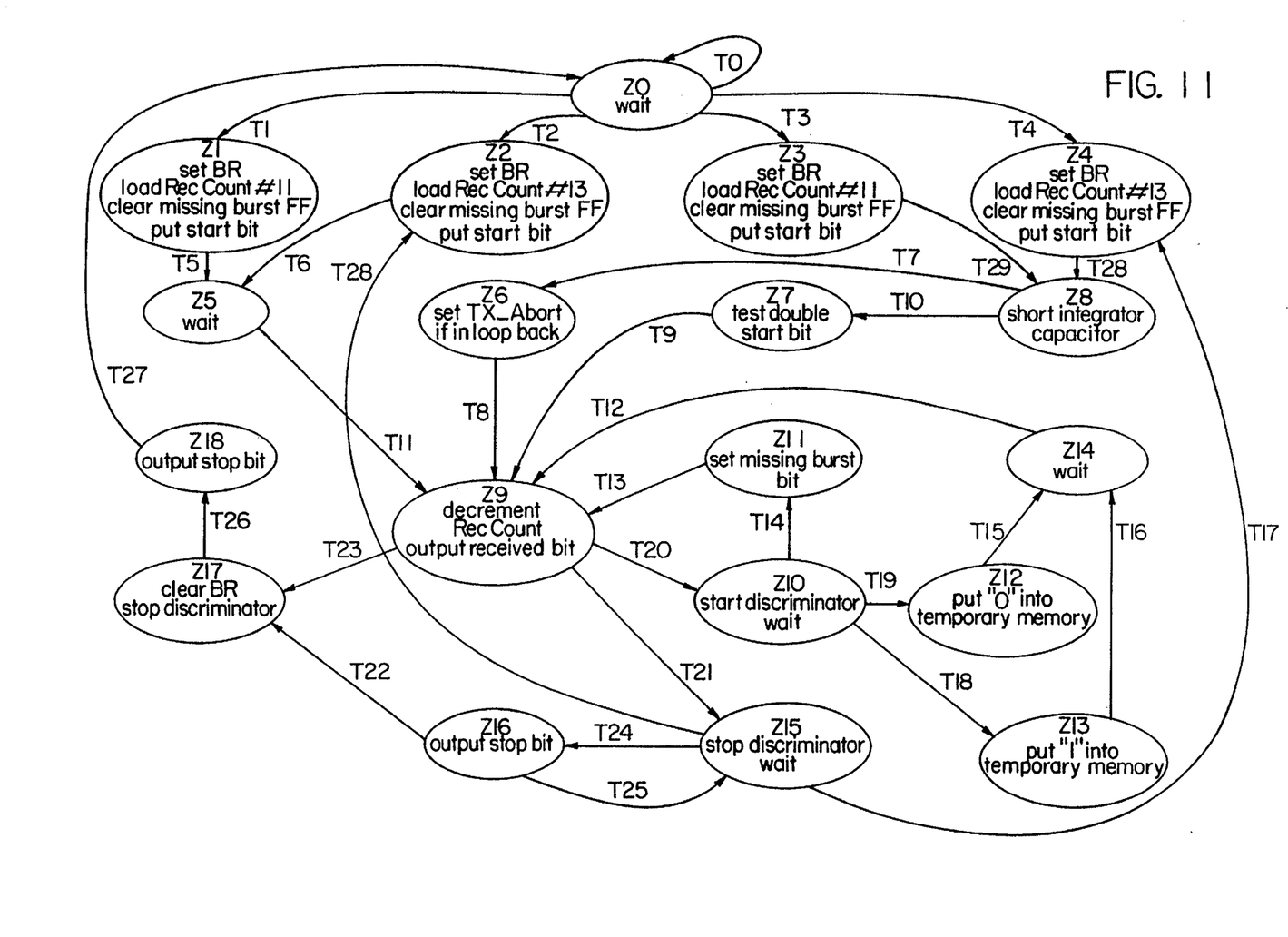
FIG. 11 is a state diagram for the state machine of the receiver part of the control unit.

The functionality of the receiver part 11 of the control unit 1 is illustrated in FIG. 11. The starting point is state Z0. A change of state here is always caused by the appearance of the rising edge of a start bit, which is brought in by the signal In_RxD from the receiver 3. Should the apparatus be configured for the flow-bridge situation, a receive counter (not shown) is loaded with the value 13 in the next state, otherwise it is loaded with the value 11. Similarly a flip-flop (not shown) is reset. This flip-flop indicates that a burst of oscillations has not been detected during the transmission of a character. A BR flip-flop is set, which indicates to the state machine 12 that there is a bit to receive. The start bit itself is loaded into an intermediate store (not shown). As soon as the R_Bit signal (rising edge) is issued by the state machine, as a handshake signal for the BR signal, state Z5 or Z8 is entered according to the type of communicator (IKP or EKP respectively). If the communicator is an IKP, it waits in state Z5. If on the other hand it is an EKP, it now resets the In_RxD signal in state Z8 by pulsed discharge of a capacitor (not shown), and then waits. If before the end of the half signal element (indicated by the falling edge of the R_Bit signal) the capacitor is recharged by a burst of oscillations, this is signalled by a rising edge on the In_RxD signal. In this case a double length start bit would have been recognised, which leads to a change to state Z7, where the end of the half signal element is awaited. The communicator in this situation has to send back the signal immediately in loopback mode as an echo. This corresponds to a direct connection to the IKP. If it has however not received a pulse on In_RxD (single length start bit) by the end of the half signal element, it has detected the start bit of an EKP and thereby may not send back an echo signal; the transmitter must therefore be blocked. This happens by changing to state Z6. The criterion for reaching this state (T7) is the appearance of a falling edge on signal R_Bit, which marks the end of the half signal element, before signal In_RxD appears.

If on the other hand a rising edge on signal In_RxD has been recognised, the change to state Z7 follows where the end of the half signal element is awaited. T8 is an immediate jump after the blocking of the transmitter in loopback mode.

In state Z9 the receive counter is decremented, the received bit is issued and the next half signal element for reception is awaited. This point in time is indicated by the state machine 12 via the R_Bit signal, which causes transition T20 to state Z10. In this state a discriminator counter (not shown) is initialised. If during the first half of the half signal element a rising edge on signal In_RxD is now detected, an intermediate store is then set at logic "1" and then the end of the half signal element is awaited (Z10, T18, Z13, T16, Z14). Should the discriminator counter count out the half duration of the half signal element and only then the rising edge of signal In_RxD appears, then logic "0" is written into the intermediate store (Z10, T19, Z12, T15, Z14). If no In_RxD signal has appeared during the second half of the half signal element either (end of signal element appears before the discriminator counter is stopped by the signal In_RxD), state Z10 is left via T14 and the expected, but missing, oscillatory burst is marked by the setting of a flip-flop in state Z11. The rising edge of this signal can indicate "error signal" to the outside world. The states Z14 and Z11 are left at the end of the half signal element, and then follows a jump to state Z9. There the bit, to be found in the intermediate store, is issued and the receive counter is decremented. In states Z9, Z10, Z12 or Z13, Z14, or Z11, Z9 the other bits are received in a similar manner.

When the last bit has been received and the communicator is in the flow-bridge mode, it changes via T21 to state Z15, where the discriminator is stopped. Now there are two bridging pseudo-bits to be "received", and should a new start bit be received during this time, there follows another change to the corresponding state Z2 or Z4 (T17 or T28). If the start bit does not come during this time, it is assumed that not only the end of the character but also the end of the message has been received, and that the communicator can return to the original state, where it can select the type of communicator (EKP, IKP) afresh according to the prevailing situation. This transition occurs via T22, Z17 (where the BR signal is reset), T26, T18 (stop bit issued) and T27.

If the receiving communicator needs to transmit during this time (waiting in state Z15), it synchronises the character to be transmitted relative to the scanning times passed on by the two pseudo-bits and not relative to the start bit of the character. In this way it is ensured that despite the existence of the delay tv (FIG. 7) which is introduced by the receive circuits (during which the start of transmission is not recognisable), synchronisation is achieved: both communicators do not quasi-simultaneously identify themselves as initiating communicators and send their start bits simultaneously.

Although infra-red light has been assumed for the transmission medium in the example explained above, it is clear without further explanation that the same method and in principle the same equipment can be used with radio transmission (obviously with the corresponding transmitters and receivers). The proposed method can also be used with other transmission media which (like fibre optic cables, for example) are suited only for half-duplex operation, not full-duplex.

I claim:

1. A method for bi-directional data communication, whereby information is transmitted between first and second communicators (KP1, KP2) each comprising a transmitter and a receiver, and whereby the transmission of information between said communicators is in serial bit signal form and the direction of signal transmission therebetween is switchable, said method comprising the steps of:

configuring first and second datastreams, respectively, for each of the communicators to have a time interval (ta) between the beginnings of successive bit signals of a datastream split during transmission into two equal periods (tb, tc), whereby first datastream bit signals are transmitted during the first period (tb);

configuring said first and second datastreams to have the same data transmission rate;

switching a transmitting communicator immediately to a receive mode after the transmission of a bit signal;

switching a receiving communicator to a transmit mode after the reception of a bit signal prior to subsequent transmission of a bit signal; and transmitting the transmitted bit signals of the second datastream during the second period (tc) of the first opposing datastream.

2. The method according to claim 1, further comprising the steps of:

generating a datastream arriving at a first communicator (KP1) at a first data speed;

adjusting said datastream speed by a first sampling means to a second data speed which is higher than the first data speed;

presenting said datastream at said second data speed to a second communicator: and reducing, after reception by the second communicator (KP2), the datastream speed by a second sampling means to a third data speed which is lower than the second data speed.

3. The method according to claim 2, further comprising the step of: selecting the second data speed, at which the data is transmitted, to have a transmission rate of 9938 Baud, whereby the time interval (ta) is 100.6 ms and the equal half time periods (tb, tc) are 50.3 ms each.

4. The method according to claim 2, further comprising the steps of: generating the second datastream speed from said first speed so that the first bit of a character is sampled at its end and the last bit is sampled at its beginning.

5. The method according to claim 2, further comprising the steps of: generating the third datastream speed from said second speed so that the last bit of a received character can still be sampled at its end when the first bit is sampled at its beginning.

6. The method according to claim 1, further comprising the steps of:

generating a transmit release signal (En Tx1, En Tx2) of square signal profile at the transmitting and at the receiving communicators;

generating the transmit release signal (En Tx1) at the transmitting communicator (KP1) in phase with the datastream Co) to be transmitted, said transmit release signal (En Tx1) having a falling edge for dividing the time interval (ta) into said two equal periods (tb, tc) thereby blocking transmission and enabling reception; and generating the transmit release signal (En Tx2) at the receiving communicator (KP2) from the received signal (In RxD) to have a rising edge that only occurs after a synchronization time following the appearance of the received signal (In RxD), the rising edge occurring simultaneously with the falling edge at the transmitting communicator (KP1) thereby blocking reception and enabling transmission.

7. The method according to claim 6, further comprising the steps of selecting the synchronization time to correspond to the first half (tb) of the time period (ta), reduced by a delay (tv) which occurs at the receiver.

8. The method according to claim 6, whereby a datastream consists of multiple successive characters, said method further comprising the steps of:

extending the transmit release signals (En Tx1, En Tx2) periodically beyond the actual character length for a defined time period; and synchronizing further characters to be transmitted relative to the transmit release signals (En Tx1, En Tx2).

9. The method according to claim 8, further comprising the steps of:

defining the transmit release defined time period to equal double the time interval (ta); and selecting an extension of a character to correspond to two bits.

10. The method according to claim 1, further comprising the steps of transmitting the bit signals in the form of pulses modulated by pulse burst position modulation.

11. The method according to claim 10, further comprising the steps of:

configuring the pulses to consist of bursts of signal oscillations which are shorter than the first half (tb) of the time period (ta);

generating a logic "1" signal to be sent out immediately at the beginning of the time period (ta) as a one of said burst of signal oscillations; and generating a logic "0" signal to be sent out a defined delay time after the beginning of the time period (ta) as a one of said burst of signal oscillations.

12. The method according to claim 11, further comprising the step of selecting the frequency of oscillation to be 460.8 kHz and the bursts of signal oscillations to consist of nine cycles, whereby a burst of signal oscillations has a duration of 19.5 ms.

13. The method according to claim 11, further comprising the step of selecting the defined delay time to be 20 ms.

14. The method according to claim 1, further comprising the step of transmitting the information by means of infrared light.

15. The method according to claim 1, further comprising the step of transmitting the information by means of radio waves.

16. The method according to claim 1, further comprising the step of transmitting the information by means of fiber optic cables.

17. Apparatus for bidirectional data communication with a direction of signal transmission which is switchable; said apparatus comprising:

first and second communicators (KP1, KP2), both having a transmitter and a receiver;

first and second control units for each of said communicators (KP1, KP2), for providing, to the communicator transmitter, a transmit control signal for enabling first signal (Out_TxD) to be output by the communicator and for providing, to the communicator receiver, a receive control signal for enabling a second signal (In_RxD) to be received by the communicator; said control unit is further adapted to receive a clock signal from an oscillator for timing the operation of said control unit; and a voltage level shifter for providing to the control unit a third signal (Input_TxD) and for receiving from the control unit a fourth signal (Output_RxD), said voltage level shifter also for receiving a fifth signal (TxD) containing information to be transmitted through the communicator's control-unit via the communicator's transmitter and said voltage level shifter passing on the received signal (In RxD) from the control unit as a sixth signal (RxD).

18. The Apparatus according to claim 17, wherein the control unit further comprises a transmitter element for transmitting said third signal (Input_TxD), a receiving element for receiving said fourth signal (Output_RxD), and a state machine element for generating a receiver control signal all of said control unit elements are electrically connected to each other;

and wherein the transmitter element has a sampling unit for sampling the third signal (Input_TxD), a modulator for providing modulation to said third signal (Input_TxD) and a multiplexer for controlling the presentation of the fourth signal (Output_RxD);

whereby the state machine element produces signals to coordinates the interaction of the transmit part and the receive part during transmission or reception of electrical signals.

19. The apparatus according to claim 17, whereby for the purpose of transmitting information by means of infra-red light, the transmitters have light emitting diodes and the receivers have photosensitive diodes, wherein each transmitter further comprises a drive stage to which a power FET is connected, such that two light emitting diodes are arranged in the transmitter output circuit and the input of the drive stage is electrically connected to the control unit via the first signal (Out TxD).

\* \* \* \* \*

UNITED STATES PATENT AND TRADEMARK OFFICE
CERTIFICATE OF CORRECTION

PATENT NO. : 5,469,285
DATED : November 21, 1995
INVENTOR(S) : Max B. Gut

It is certified that error appears in the above-indentified patent and that said Letters Patent is hereby corrected as shown below:

<u>Column 10</u>

Line 11, delete "Co)" and substitute --(b)--.
Line 25, delete "steps" and substitute --step--.
Line 44, delete "steps" and substitute --step--.

Signed and Sealed this

Nineteenth Day of March, 1996

Attest:

BRUCE LEHMAN

Attesting Officer     Commissioner of Patents and Trademarks